United States Patent
Ye et al.

(10) Patent No.: US 12,034,332 B2
(45) Date of Patent: Jul. 9, 2024

(54) POWER SOURCE SWITCHING CONTROL SYSTEM AND POWER SOURCE SWITCHING CONTROL METHOD

(71) Applicant: Huawei Digital Power Technologies Co., Ltd., Shenzhen (CN)

(72) Inventors: Wanxiang Ye, Dongguan (CN); Zehua Liang, Dongguan (CN); Yanxing Yang, Dongguan (CN); Wei Guo, Dongguan (CN); Zezhou Yang, Dongguan (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 118 days.

(21) Appl. No.: 17/743,294

(22) Filed: May 12, 2022

(65) Prior Publication Data

US 2022/0271562 A1    Aug. 25, 2022

Related U.S. Application Data

(63) Continuation of application No. PCT/CN2020/123859, filed on Oct. 27, 2020.

(30) Foreign Application Priority Data

Nov. 13, 2019 (CN) .......................... 201911108961.3

(51) Int. Cl.
*H02J 9/06* (2006.01)
(52) U.S. Cl.
CPC .............. *H02J 9/068* (2020.01); *H02J 9/066* (2013.01)

(58) Field of Classification Search
CPC .... H02J 9/068; H02J 9/066; H02J 9/06; H02J 9/061
See application file for complete search history.

(56) References Cited

U.S. PATENT DOCUMENTS

| 10,216,212 B1 | 2/2019 | Felipe |
| 2015/0035358 A1* | 2/2015 | Linkhart ............... H02J 3/0073 307/64 |

FOREIGN PATENT DOCUMENTS

| CN | 201374583 Y | 12/2009 |
| CN | 102664465 A | 9/2012 |
| CN | 102779693 A | 11/2012 |
| CN | 103872760 A | 6/2014 |
| CN | 204732962 U | 10/2015 |
| CN | 107958561 A | 4/2018 |
| CN | 207819548 U | 9/2018 |

(Continued)

*Primary Examiner* — Lincoln D Donovan
*Assistant Examiner* — Alex W Lam
(74) *Attorney, Agent, or Firm* — WOMBLE BOND DICKINSON (US) LLP

(57) ABSTRACT

In the power source switching control system, a circuit breaker includes a controller and an on/off apparatus. The controller controls, based on a signal of a monitor, the on/off apparatus to adjust an on/off state of a power source connected to the circuit breaker, that is, adjust, from an on state to an off state based on a switch-off signal of the monitor, a working power source that is currently working, and adjust a backup power source from an off state to an on state based on a switch-on signal of the monitor, to implement a process of power source switching between the working power source and the backup power source.

20 Claims, 12 Drawing Sheets

(56) References Cited

FOREIGN PATENT DOCUMENTS

EP          3082215  A1    10/2016
WO       2017032426  A1     3/2017

\* cited by examiner

POWER SOURCE SWITCHING CONTROL SYSTEM AND POWER SOURCE SWITCHING CONTROL METHOD

CROSS-REFERENCE TO RELATED APPLICATIONS

This application is a continuation of International Application No. PCT/CN2020/123859, filed on Oct. 27, 2020, which claims priority to Chinese Patent Application No. 201911108961.3, filed on Nov. 13, 20019. The disclosures of the aforementioned applications are hereby incorporated by reference in their entireties.

TECHNICAL FIELD

This application relates to the field of power source control, and in particular, to a power source switching control system and a power source switching control method.

BACKGROUND

To ensure reliable power supply of a communication system, a multi-source power supply system may be generally used for a communication power source. A common system is a dual-source power supply system, that is, two different power sources are connected to a power shelf, and two different circuit breakers in the power shelf respectively control different power sources to be turned on/off, so that the power sources are backed up by each other. However, the power shelf can generally obtain power from only one of the power sources. If the two power sources are simultaneously turned on, the two different power sources are short-circuited, and a grid-connection accident may occur during cable entry of the dual power sources.

In a conventional technology, a dual-source power supply interlock function solution of the communication power source may be implemented by using automatic transfer switch (ATS) equipment. The ATS is an apparatus that includes two interlock switches and that is configured to implement a power source switching function. The switch in the ATS is a contactor or a blade that does not have a short-circuit current breaking capability, and the two interlock switches are implemented by using a mechanical connecting rod.

However, in the solution in which the ATS is used, each power source is further equipped with an independent input circuit breaker. This is equivalent to that the circuit breaker is connected in series with the switch in the ATS, so that the two switches that are implemented by using the mechanical connecting rod and that are in the ATS are packaged in one ATS housing. Therefore, the power source switching function can be implemented only when relative positions of the two input power sources meet a position relationship specified by the mechanical connecting rod in the ATS. As a result, a specified limitation is imposed on the relative positions of the two input power sources connected to the mechanical connecting rod, causing poor wiring flexibility.

SUMMARY

Embodiments of this application provide a power source switching control system and a power source switching control method, to optimize power source arrangement in a scenario in which a plurality of power sources supply power.

In some embodiments (sometimes referred to as, "a first aspect"), this application provides a power source switching control system that may be applied to a scenario in which a plurality of power sources supply power. In some embodiments, to ensure continuous power supply without interruption, the plurality of power sources include a working power source that is currently working and/or a backup power source for emergency auxiliary use. Specifically, for any power source in the plurality of power sources, if the power source is currently supplying power, the power source is the working power source; or if the power source is not currently supplying power, the power source is the backup power source. The working power source and the backup power source are backed up by each other. The power source switching control system includes a first circuit breaker connected to the working power source, a second circuit breaker connected to the backup power source, and/or a monitor configured to control the first circuit breaker to be turned on/off and/or the second circuit breaker to be turned on/off. The first circuit breaker includes a first controller and/or a first on/off apparatus that are connected to each other. The first controller is connected to the monitor. The second circuit breaker includes a second controller and/or a second on/off apparatus that are connected to each other. The second controller is connected to the monitor. When the monitor generates or receives a power source switching instruction, the monitor generates a switch-off signal and/or a switch-on signal based on the power source switching instruction, sends the switch-off signal to the first controller that is configured to control the working power source and that is located in the first circuit breaker, and/or sends the switch-on signal to the second controller that is configured to control the backup power source and that is located in the second circuit breaker. Subsequently, the first controller is configured to control, based on the switch-off signal of the monitor, the first on/off apparatus in the first circuit breaker to adjust (e.g., modify, transition) an on/off state of the working power source from an on state to an off state. The second controller is configured to control, based on the switch-on signal of the monitor, the second on/off apparatus to adjust an on/off state of the backup power source from an off state to an on state. For the first circuit breaker and the second circuit breaker, an on/off apparatus specifically adjusts, based on a signal of the monitor, an on/off state of a power source connected to a circuit breaker, that is, adjusts, from an on state to an off state based on the switch-off signal of the monitor, the working power source that is currently working, and/or adjusts the backup power source from an off state to an on state based on the switch-on signal of the monitor, to implement a process of power source switching between the working power source and the backup power source. In comparison with a conventional technology in which a power source switching process is executed by using an independent ATS, a structure of an input part of a power source is simplified, there is no space limitation caused by a mechanical connection, and flexible power source arrangement is easy to implement.

It should be noted that the power source switching control system may be applied to a scenario in which a plurality of power sources supply power. A power source quantity corresponding to the plurality of power sources is n (e.g., n is an integer greater than 1), and quantities of working power sources and backup power sources are respectively a and b (e.g., both a and b are integers greater than 0). The quantity may be adjusted based on a working environment of an on-site operation. For example, the working power source and the backup power source each may be a single power source, two power sources, and a plurality of power sources. This is not limited herein. In some embodiments, in an actual operation process, when the quantity of backup power sources is large, a power source with good power supply quality may be preferably selected from the backup power sources based on power supply quality of the backup power sources.

In some embodiments, to ensure that the backup power source is turned on after the working power source in the power source switching control system is turned off, the power source switching control system may further include a logic control apparatus. The first controller is connected to the monitor through the logic control apparatus, and the second controller is also connected to the monitor through the logic control apparatus. In other words, after the first controller and the second controller are both connected to the logic control apparatus, the logic control apparatus is connected to the monitor. After the logic control apparatus determines that the on/off state of the working power source is adjusted from an on state to an off state, the logic control apparatus sends the switch-on signal of the monitor to the second controller. The logic control apparatus may be implemented by using a hardware module, or may be implemented by using a software module. For example, the logic control apparatus may be implemented by using a logic circuit, or may be implemented in a manner in which a programmable chip cooperates with logic software, or may be implemented in another manner. This is not limited herein.

In this embodiment, only after determining that the on/off state of the working power source is adjusted from an on state to an off state, the logic control apparatus sends the switch-on signal of the monitor to the second controller, so that the second controller controls, based on the switch-on signal, the second on/off apparatus to adjust the on/off state of the backup power source from an off state to an on state. Therefore, the logic control apparatus is disposed to ensure a grid-connection accident occurring when the working power source and the backup power source are simultaneously turned on. In some embodiments, the logic control apparatus may specifically determine, in a plurality of manners, that the on/off state of the working power source is adjusted from an on state to an off state.

In some embodiments, the logic control apparatus is configured to send, only to one of the first controller and the second controller, a control signal sent by the monitor, where the control signal may include the switch-off signal or the switch-on signal. In other words, in the signal delivered by the monitor, the switch-off signal can be sent only to one of the first controller and the second controller, and the switch-on signal can also be sent only to one of the first controller and the second controller.

In this embodiment, to avoid a case in which both the working power source and the backup power source are turned off because the monitor simultaneously sends the switch-off signal to the first circuit breaker and the second circuit breaker due to a fault, and avoid a grid-connection accident occurring when the working power source and the backup power source are simultaneously turned on because the monitor simultaneously sends the switch-on signal to the first circuit breaker and the second circuit breaker due to a fault, signal control may be strengthened through the logic control apparatus to ensure power consumption safety.

In some embodiments, the first on/off apparatus further includes a first contact, and the first contact is configured to: detect the on/off state of the working power source, and feed back the on/off state of the working power source to the monitor. The second on/off apparatus further includes a second contact, and the second contact is configured to: detect the on/off state of the backup power source, and feed back the on/off state of the backup power source to the monitor. The on/off state of the working power source indicates that the working power source is turned on or turned off, and the on/off state of the backup power source indicates that the backup power source is turned on or turned off.

In this embodiment, the monitor may determine an on/off state of a power source by using a contact disposed in an on/off apparatus in a circuit breaker, that is, the monitor detects the on/off state of the working power source by using the first contact in the first on/off apparatus, feeds back the on/off state of the working power source to the monitor, detects the on/off state of the backup power source by using the second contact in the second on/off apparatus, and feeds back the on/off state of the backup power source to the monitor.

In some embodiments, the power source switching control system may further include a sensor. One terminal of the sensor is connected to the working power source and the backup power source, and is configured to collect a power supply parameter of the working power source and a power supply parameter of the backup power source. The other terminal of the sensor is connected to the monitor, and is configured to send the power supply parameter of the working power source and the power supply parameter of the backup power source to the monitor.

In this embodiment, there may be one or more sensors. In some embodiments, the sensor is configured to: collect the power supply parameter of the working power source and the power supply parameter of the backup power source, and feed back the power supply parameter of the working power source and the power supply parameter of the backup power source to the monitor, so that the monitor can learn of the power supply parameter of the working power source and the power supply parameter of the backup power source. The sensor may be a voltage sensor, a current sensor, or the like. Therefore, the power supply parameter may include a voltage value, a current value, a curve in which a voltage or a current changes with time, or another power supply parameter. In some embodiments, the monitor may also respectively determine the on/off state of the working power source and the on/off state of the backup power source based on the power supply parameter of the working power source and the power supply parameter of the backup power source.

In some embodiments, the apparatus further includes a busbar, and the monitor is connected to both the first controller and the second controller through the busbar.

In this embodiment, a connection between the monitor and each of the first controller and the second controller may be a wired connection, or may be a wireless connection. Herein, the following limitation is imposed: The monitor is connected to the first controller and the second controller through the busbar, to provide a specific implementation of the solution. In some embodiments, if the system further includes a hardware-implemented logic control apparatus and/or the sensor, the logic control apparatus and/or the sensor may also be integrated into the busbar.

In some embodiments (sometimes referred to as, "a second aspect"), this application provides a power source switching control method, applied to a power source switching control system that may be applied to a scenario in which a plurality of power sources supply power. In some embodiments, to ensure continuous power supply without interruption, the plurality of power sources include a working power source that is currently working and a backup power source for emergency auxiliary use. In some embodiments, for any power source in the plurality of power sources, if the power source is currently supplying power, the power source is the working power source; or if the power source is not currently supplying power, the power source is the backup power source. The working power source and the backup power source are backed up by each other. The power source switching control system includes a first circuit breaker connected to the working power source, a second circuit breaker connected to the backup power source, and a monitor configured to control the first circuit breaker to be turned on/off and the second circuit breaker to be turned on/off. For the monitor, the power source switching control method includes: The monitor may generate or obtain a manually input power source switching instruction in a plurality of manners, where the power source switching instruction is used to indicate that in the plurality of power sources, the working power source needs to be turned off and the backup power source needs to be turned on. The monitor generates, based on the power source switching instruction, a switch-off signal used to control the working power source to be turned off and a switch-on signal used to control the backup power source to be turned on. Subsequently, the monitor sends the switch-off signal to a first controller, where the first controller is included in the first circuit breaker, the first circuit breaker includes a first on/off apparatus, and the first on/off apparatus is configured to adjust an on/off state of the working power source under control of the first controller, that is, adjust, from an on state to an off state, the working power source that is currently supplying power. The monitor sends the switch-on signal to a second controller, where the second controller is included in the second circuit breaker, the second circuit breaker includes a second on/off apparatus, and the second on/off apparatus is configured to adjust an on/off state of the backup power source under control of the second controller, that is, adjust, from an off state to an on state, the backup power source that is not currently supplying power. Therefore, for the first circuit breaker and the second circuit breaker, an on/off apparatus specifically adjusts, based on a signal of the monitor, an on/off state of a power source connected to a circuit breaker, that is, adjusts, from an on state to an off state based on the switch-off signal of the monitor, the working power source that is currently working, and adjusts the backup power source from an off state to an on state based on the switch-on signal of the monitor, to implement a process of power source switching between the working power source and the backup power source. In comparison with a conventional technology in which a power source switching process is executed by using an independent ATS, a structure of an input part of a power source is simplified, there is no space limitation caused by a mechanical connection, and flexible power source arrangement is easy to implement.

It should be noted that the power source switching control system may be applied to a scenario in which a plurality of power sources supply power. A power source quantity corresponding to the plurality of power sources is n (e.g., n is an integer greater than 1), and power source quantities corresponding to the working power source and the backup power source are respectively a and b (e.g., both a and b are integers greater than 0). The quantity may be adjusted based on a working environment of an on-site operation. For example, the working power source and the backup power source each may be a single power source, two power sources, and a plurality of power sources. This is not limited herein. In some embodiments, in an actual operation process, when the quantity of backup power sources is large, a power source with good power supply quality may be preferably selected from the backup power sources based on power supply quality of the backup power sources.

In some embodiments, the power source switching control method further includes: The monitor obtains a switch-off feedback signal, where the switch-off feedback signal is used to indicate that the on/off state of the working power source is adjusted from an on state to an off state. Only after the monitor determines that the switch-off feedback signal is received, that is, only after the monitor determines that the on/off state of the working power source is adjusted from an on state to an off state, the monitor sends the switch-on signal to the second controller.

In this embodiment, only after the monitor determines that the switch-off feedback signal is received, that is, only after the monitor determines that the on/off state of the working power source is adjusted from an on state to an off state, the monitor sends the switch-on signal to the second controller. Therefore, the monitor can be prevented from sending the switch-on signal to the second controller before the on/off state of the working power source is adjusted from an on state to an off state, to avoid a grid-connection accident occurring when the working power source and the backup power source are simultaneously turned on.

In some embodiments, that the monitor obtains a switch-off feedback signal includes: The monitor receives the switch-off feedback signal sent by a first contact, where the first contact is included in the first circuit breaker, and the first contact is configured to detect the on/off state of the working power source.

In this embodiment, a specific implementation in which the monitor obtains the switch-off feedback signal is provided, that is, the switch-off feedback signal may be obtained by using the first contact in the first circuit breaker, to improve implementability of the solution.

In some embodiments, that the monitor obtains a switch-off feedback signal includes: The monitor receives the switch-off feedback signal sent by a sensor, where the sensor is connected to the working power source, and is configured to collect a power supply parameter of the working power source, and the power supply parameter of the working power source includes the on/off state of the working power source.

In this embodiment, a specific implementation in which the monitor obtains the switch-off feedback signal is provided, that is, the switch-off feedback signal may be obtained by using the power supply parameter collected by the sensor, to improve implementability of the solution.

In some embodiments, the method further includes: The monitor sends a switch-off verification code to the first controller, where the switch-off verification code is used by the first controller to verify validity of the switch-off signal; and/or the monitor sends a switch-on verification code to the second controller, where the switch-on verification code is used by the second controller to verify validity of the switch-on signal.

In this embodiment, to avoid a misoperation caused by a communication fault, the switch-off verification code and/or the switch-on verification code are/is added, and a signal sent by the monitor to the first controller and/or the second controller includes several fixed parity bits. The first controller and/or the second controller automatically detect/detects and check/checks whether the parity bits are normal. If the parity bits are normal, a switch-off/on command is executed. If the parity bits are not normal, execution of a switch-off/on command is rejected. Therefore, it is ensured that when the monitor is faulty (e.g., is powered off) or when there is a communication fault, the first controller and/or the second controller can maintain normal on/off states of the first circuit breaker and/or the second circuit breaker, to continue to supply power.

In some embodiments, the method further includes: The monitor receives a switch-on feedback signal sent by a second contact, where the second contact is included in the second circuit breaker, and the second contact is configured to detect the on/off state of the backup power source.

In this embodiment, a specific implementation in which the monitor obtains the switch-on feedback signal is provided, that is, the switch-on feedback signal may be obtained by using the second contact in the second circuit breaker, so that the monitor can learn of the on/off state of the backup power source connected to the second circuit breaker, to improve implementability of the solution.

In some embodiments, the method further includes: The monitor receives a switch-on feedback signal sent by the sensor, where the sensor is connected to the backup power source, and is configured to collect a power supply parameter of the backup power source, and the power supply parameter of the backup power source includes the on/off state of the backup power source.

In this embodiment, a specific implementation in which the monitor obtains the switch-on feedback signal is provided, that is, the switch-on feedback signal may be obtained by using the second contact in the second circuit breaker, so that the monitor can learn of the on/off state of the backup power source connected to the second circuit breaker, to improve implementability of the solution.

In some embodiments (sometimes referred to as, "a third aspect"), this application provides a monitor, where the monitor has a function of implementing the method in any one of the second aspect or the possible implementations of the second aspect. The function may be implemented by hardware, or may be implemented by hardware executing corresponding software. The hardware or the software includes one or more modules corresponding to the foregoing function, for example, an obtaining unit, a generation unit, and a transceiver unit.

In some embodiments (sometimes referred to as, "a fourth aspect"), this application provides a monitor, where the monitor includes at least one processor, a memory, a communication port, and computer execution instructions that are stored in the memory and that can be run on the processor. When the computer execution instructions are executed by the processor, the processor performs the method in any one of the second aspect or the possible implementations of the second aspect.

In some embodiments (sometimes referred to as, "a fifth aspect"), this application provides a computer-readable storage medium storing one or more computer-executable instructions. When the computer-executable instructions are executed by a processor, the processor performs the method according to any one of the second aspect or the possible implementations of the second aspect.

In some embodiments (sometimes referred to as, "a sixth aspect"), this application provides a computer program product storing one or more computer-executable instructions. When the computer-executable instructions are executed by the processor, the processor performs the method according to any one of the second aspect or the possible implementations of the second aspect.

In some embodiments (sometimes referred to as, "a seventh aspect"), this application provides a chip system. The chip system includes a processor, configured to support a controller in implementing a function in any one of the second aspect or the possible implementations of the second aspect. In a possible design, the chip system may further include a memory. The memory is configured to store necessary program instructions and data. The chip system may include a chip, or may include a chip and another discrete device.

For technical effects brought by any one of the third aspect to the seventh aspect or the possible implementations of the third aspect to the seventh aspect, refer to technical effects brought by the second aspect or the different possible implementations of the second aspect. Details are not described herein again.

It can be learned from the foregoing technical solutions that embodiments of this application have the following advantages:

In the embodiments, the power source switching control system includes the first circuit breaker connected to a first power source, the second circuit breaker connected to a second power source, and the monitor. The first circuit breaker includes the first controller and the first on/off apparatus. The first controller is configured to control, based on the switch-off signal of the monitor, the first on/off apparatus to adjust the first power source from an on state to an off state. The second circuit breaker includes the second controller and the second on/off apparatus. The second controller is configured to control, based on the switch-on signal of the monitor, the second on/off apparatus to adjust the second power source from an off state to an on state. In the power source switching control system, a circuit breaker includes a controller and an on/off apparatus. The controller controls, based on a signal of the monitor, the on/off apparatus to adjust an on/off state of a power source connected to the circuit breaker, that is, adjust, from an on state to an off state based on the switch-off signal of the monitor, the working power source that is currently working, and adjust the backup power source from an off state to an on state based on the switch-on signal of the monitor, to implement a process of power source switching between the working power source and the backup power source. In comparison with a conventional technology in which a power source switching process is executed by using an independent ATS, a structure of an input part of a power source is simplified, there is no space limitation caused by a mechanical connection, and flexible power source arrangement is easy to implement.

DESCRIPTION OF EMBODIMENTS

Figure 1:
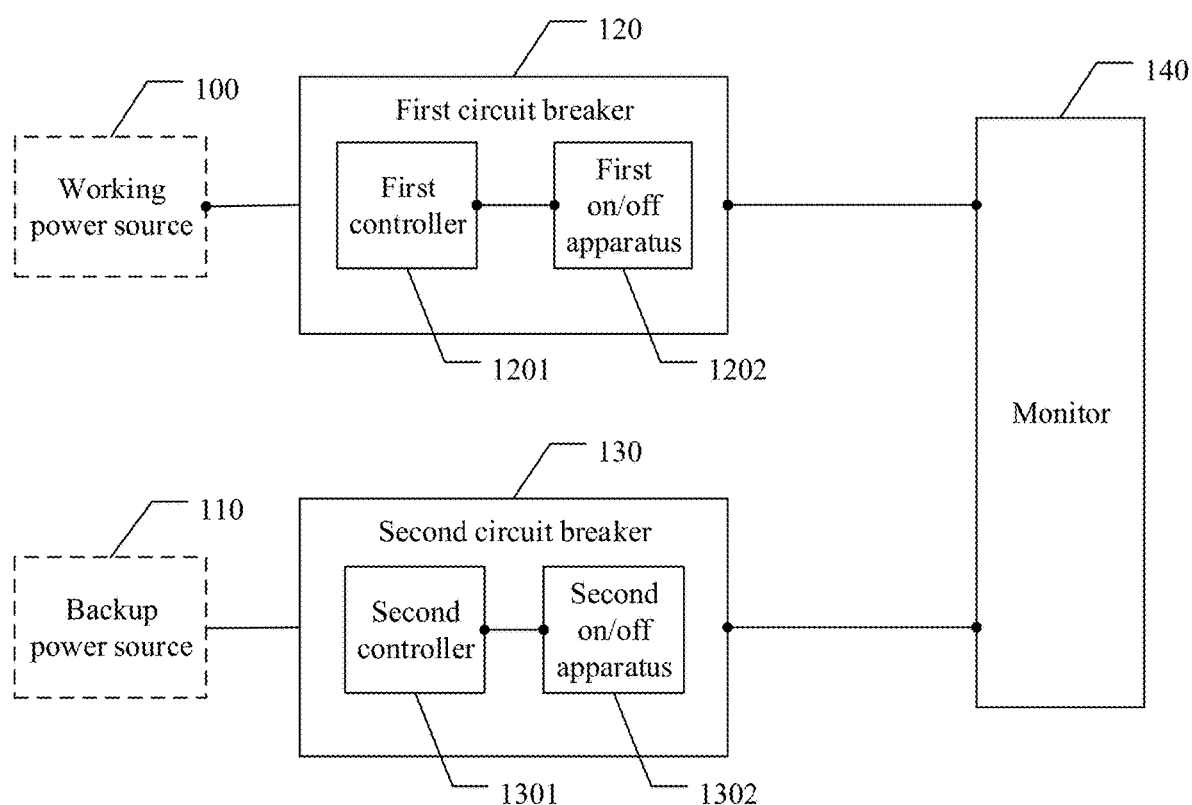
FIG. 1 is a schematic diagram of a power source switching control system according to an embodiment of this application.

Embodiments of this application provide a power source switching control system and a power source switching control method, to optimize power source arrangement in a scenario in which a plurality of power sources supply power.

To ensure reliable power supply of a communication system, a multi-source power supply system may be generally used for a communication power source. A common system is a dual-source power supply system, that is, two different power sources are connected to a power shelf, and two different circuit breakers in the power shelf respectively control different power sources to be turned on/off, so that the power sources are backed up by each other. However, the power shelf can generally obtain power from only one of the power sources. If the two power sources are simultaneously turned on, the two different power sources are short-circuited, and a grid-connection accident may occur during cable entry of the dual power sources. In a conventional technology, a dual-source power supply interlock function solution of the communication power source may be implemented by using automatic transfer switch ATS equipment. The ATS is an apparatus that includes two interlock switches and that is configured to implement a power source switching function. The switch in the ATS is a contactor or a blade that does not have a short-circuit current breaking capability, and the two interlock switches are implemented by using a mechanical connecting rod.

However, in the solution in which the ATS is used, each power source is further equipped with an independent input circuit breaker. This is equivalent to that the circuit breaker is connected in series with the switch in the ATS, so that the two switches that are implemented by using the mechanical connecting rod and that are in the ATS are packaged in one ATS housing. Therefore, the power source switching function can be implemented only when relative positions of the two input power sources meet a position relationship specified by the mechanical connecting rod in the ATS. As a result, a specified limitation is imposed on the relative positions of the two input power sources connected to the mechanical connecting rod, causing poor wiring flexibility.

The following specifically describes the power source switching control system in the embodiments of this application. The power source switching control system may be applied to a scenario in which a plurality of power sources supply power. In some embodiments, to ensure continuous power supply without interruption, the plurality of power sources include a working power source that is currently working and a backup power source for emergency auxiliary use. In some embodiments, for any power source in the plurality of power sources, if the power source is currently supplying power, the power source is the working power source; or if the power source is not currently supplying power, the power source is the backup power source. The working power source and the backup power source are backed up by each other.

Refer to FIG. 1. A power source switching control system in an embodiment of this application includes a first circuit breaker 120 connected to a working power source 100, a second circuit breaker 130 connected to a backup power source 110, and a monitor 140 configured to control the first circuit breaker 120 to be turned on/off and the second circuit breaker 130 to be turned on/off. The first circuit breaker 120 includes a first controller 1201 and a first on/off apparatus 1202 that are connected to each other. The first controller 1202 is connected to the monitor 140. The second circuit breaker 130 includes a second controller 1301 and a second on/off apparatus 1302 that are connected to each other. The second controller 1301 is connected to the monitor 140. When the monitor 140 generates or receives a power source switching instruction, the monitor 140 generates a switch-off signal and a switch-on signal based on the power source switching instruction, sends the switch-off signal to the first controller 1201 that is configured to control the working power source 100 and that is located in the first circuit breaker 120, and sends the switch-on signal to the second controller 1301 that is configured to control the backup power source 110 and that is located in the second circuit breaker 130. Subsequently, the first controller 1201 is configured to control, based on the switch-off signal sent by the monitor 140, the first on/off apparatus 1202 in the first circuit breaker 120 to adjust an on/off state of the working power source 100 from an on state to an off state. The second controller 130 is configured to control, based on the switch-on signal sent by the monitor 140, the second on/off apparatus 1302 to adjust an on/off state of the backup power source 110 from an off state to an on state.

In this embodiment, for the first circuit breaker 120 and the second circuit breaker 130, an on/off apparatus specifically adjusts, based on a signal of the monitor 140, an on/off state of a power source connected to a circuit breaker, that is, adjusts, from an on state to an off state based on the switch-off signal of the monitor 140, the working power source 100 that is currently working, and adjusts the backup power source 110 from an off state to an on state based on the switch-on signal of the monitor 140, to implement a process of power source switching between the working power source 100 and the backup power source 110.

It should be noted that the power source switching control system may be applied to a scenario in which a plurality of power sources supply power. A power source quantity corresponding to the plurality of power sources is n (e.g., n is an integer greater than 1), and power source quantities corresponding to the working power source and the backup power source are respectively a and b (e.g., both a and b are integers greater than 0). The quantity may be adjusted based on a working environment of an on-site operation. This is not limited herein. Correspondingly, a quantity of first circuit breakers configured to control the working power source may be equal to the power source quantity corresponding to the working power source, and a quantity of second circuit breakers configured to control the backup power source may also be equal to the power source quantity corresponding to the backup power source. In some embodiments, in an actual operation process, when the quantity of backup power sources is large, a power source with good power supply quality may be preferably selected from the backup power sources based on power supply quality of the backup power sources.

Figure 2:
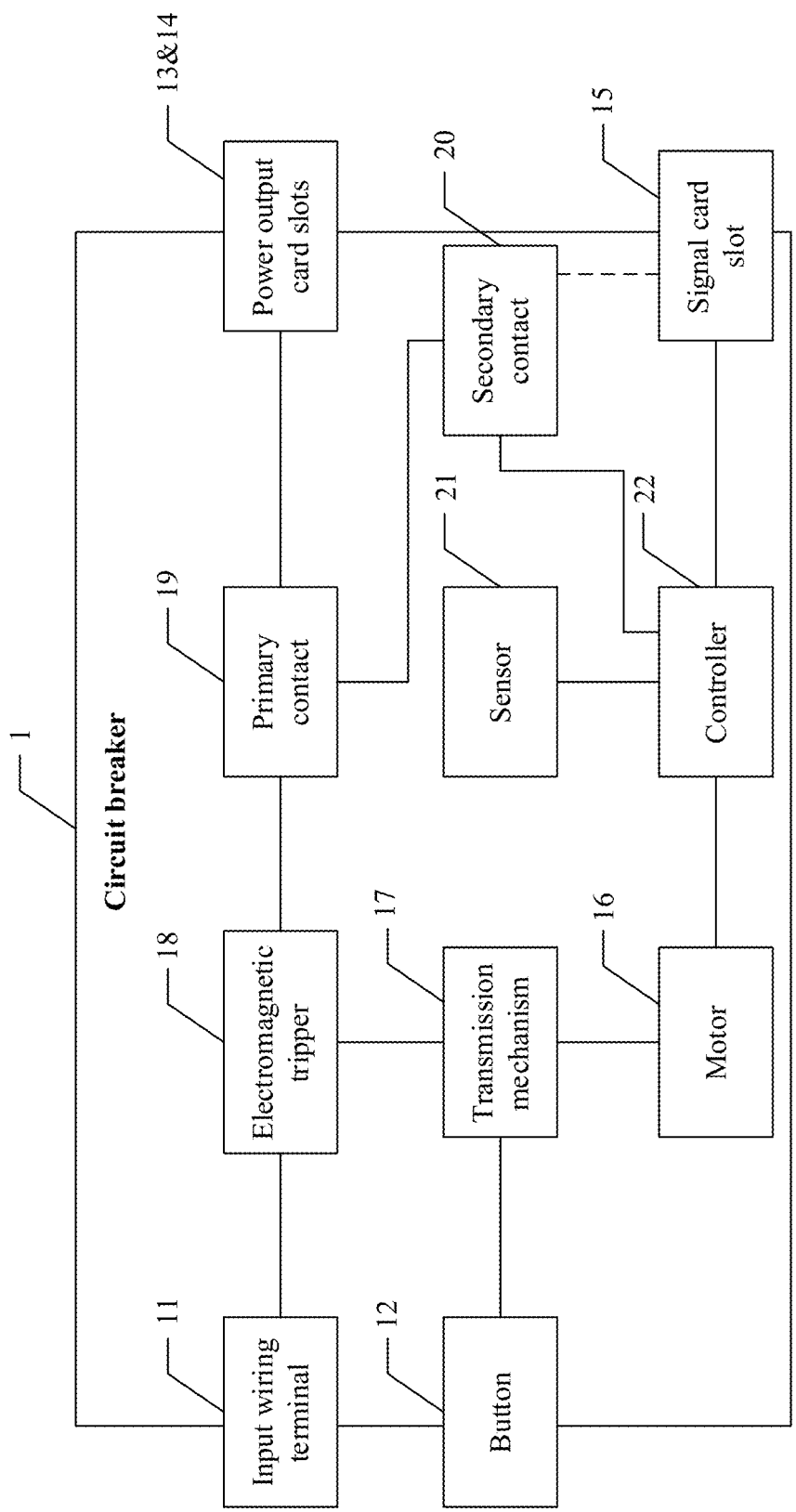
FIG. 2 is another schematic diagram of a power source switching control system according to an embodiment of this application.
Figure 3:
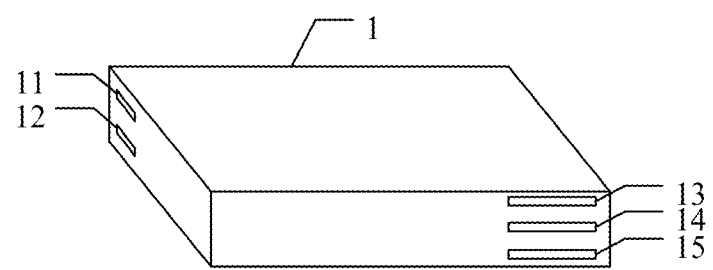
FIG. 3 is another schematic diagram of a power source switching control system according to an embodiment of this application.

In some embodiments, specifically, circuit breakers with a same structure may be used for the first circuit breaker 120 and the second circuit breaker 130. FIG. 2 and FIG. 3 are schematic diagrams of the circuit breakers with a same structure. A circuit breaker 1 includes an input wiring terminal 11 that is configured to be connected to a power source, a physical button 12 used for control, power output card slots 13&14 used for output, a communication card slot 15 used to communicate with the outside, and an on/off apparatus configured to turn on/off a power source. The on/off apparatus may be implemented by using a motor 19, a transmission mechanism 20, and an electromagnetic tripper 21 that are connected to each other, or may be implemented by using a primary contact 19 or a secondary contact 20. This is not limited herein. The circuit breaker 1 further includes a sensor 21 and a controller 22 configured to control each component in the circuit breaker 1.

In this embodiment of this application, specifically, in the power source switching control system, the monitor 140 respectively sends the switch-off signal and the switch-on signal to the first controller 1201 and the second controller 1301 by using a wired connection or a wireless connection. In some embodiments, because a signal transmission speed is large, and a moment at which the first controller 1201 receives the switch-off signal is close to a moment at which the second controller 1301 receives the switch-on signal, there may be a time difference between processes executed by the first controller 1201 and the second controller 1301. There are buffer apparatuses in some power consumption loads that are connected to a power source. The buffer apparatus may enable the power consumption load to still work normally when the working power source 100 and the backup power source 110 are simultaneously turned on or turned off. However, for a power consumption load that is sensitive to a current and a voltage, when the working power source 100 and the backup power source 110 are simultaneously turned on or turned off, the power consumption load is faulty and damaged. To avoid the case, a logic control apparatus may be disposed to interlock the first circuit breaker 120 and the second circuit breaker 130. In a specific implementation process, the logic control apparatus may implement the interlock process by using a software module or a hardware module. The following is described by using a specific embodiment.

1. The logic control apparatus interlocks the first circuit breaker 120 and the second circuit breaker 130 by using a software module.

In this embodiment, a software module may be added to interlock the first circuit breaker 120 and the second circuit breaker 130. The software module may be independently disposed, or may be integrated into the monitor 140. In this embodiment, that the software module is integrated into the monitor 140 is only used as an example for description. In some embodiments, implementation logic of the software module is as follows: Only after the monitor 140 determines that the on/off state of the working power source 100 is adjusted from an on state to an off state, that is, only after the monitor receives a switch-off success feedback of the first circuit breaker 120 corresponding to the working power source 100, the monitor sends the switch-on signal to the second controller 1301 that is in the second circuit breaker 130 and that controls the backup power source 110 to be turned on/off. In an optional operation, after the monitor determines that a switch-on feedback of the second circuit breaker 130 corresponding to the backup power source 110 is received, the monitor may complete a current power source switching process.

Figure 4:
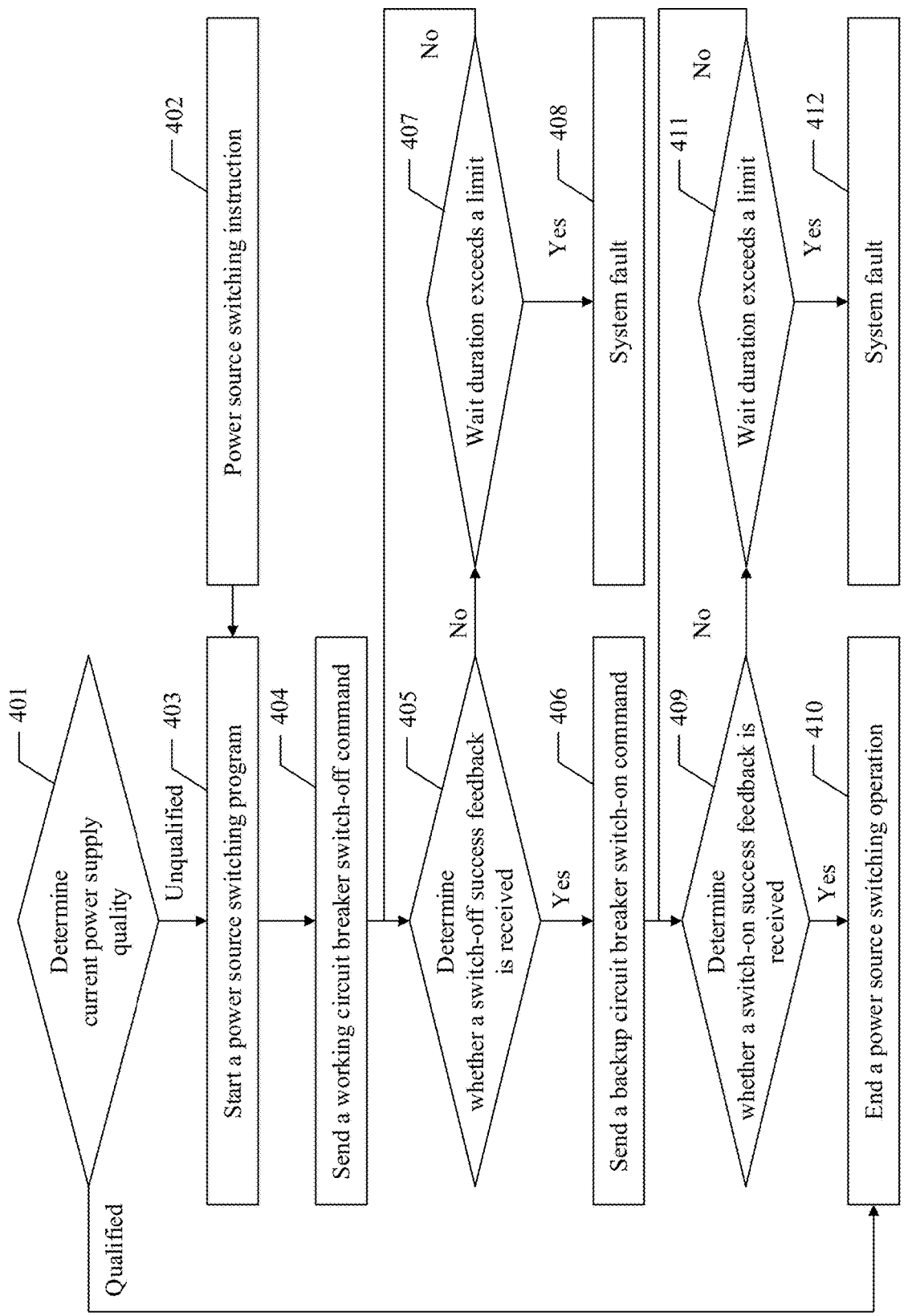
FIG. 4 is another schematic diagram of a power source switching control system according to an embodiment of this application.

For a specific working process of the monitor, refer to FIG. 4. A related process executed by the monitor may include the following operations:

Operation 401. The monitor determines power supply quality of a current working power source; and if the power supply quality of the current working power source is qualified, the monitor performs operation 410; or if the power supply quality of the current working power source is not qualified, the monitor performs operation 403.

Operation 402. When receiving a power source switching instruction, the monitor is triggered to perform operation 403.

Operation 403. When determining, in operation 401, that the power supply quality of the current working power source is not qualified, or when receiving the power source switching instruction in operation 402, the monitor starts a power source switching program.

Operation 404. The monitor sends a working circuit breaker switch-off command, that is, sends a switch-off command to a circuit breaker corresponding to the current working power source.

Operation 405. The monitor determines whether a switch-off success feedback is received; and if the switch-off success feedback is received, the monitor performs operation 406; or if the switch-off success feedback is not received, the monitor performs operation 407.

Operation 406. If the monitor determines that the switch-off success feedback is received, the monitor sends a backup circuit breaker switch-on command, that is, sends a switch-on command to a circuit breaker in which a backup power source is located.

Operation 407. If the monitor does not receive the switch-off success feedback, the monitor determines whether preset wait duration exceeds a limit; and if the preset wait duration exceeds the limit, the monitor determines operation 408; or if the preset wait duration does not exceed the limit, the monitor feeds back to operation 405 to determine that the switch-off success feedback is received.

Operation 408. When the monitor determines that the preset wait duration exceeds the limit, the monitor determines that a system fault occurs. In this case, a fault lamp/a fault alarm/the like may be used to remind an on-site operator to perform manual troubleshooting.

Operation 409. After the monitor sends the backup circuit breaker switch-on command in operation 406, the monitor determines whether a switch-on success feedback is received; and if the switch-on success feedback is received, the monitor performs operation 410; or if the switch-on success feedback is not received, the monitor performs operation 411.

Operation 410. When the monitor determines, in operation 401, that the power supply quality of the current working power source is qualified, or when the monitor determines, in operation 409, that the switch-on success feedback is received, the monitor determines that a current power source switching operation ends, and may exit the power source switching program.

Operation 411. If the monitor determines, in operation 409, that the switch-on success feedback is not received, the monitor determines whether preset wait duration exceeds a limit; and if the preset wait duration exceeds the limit, the monitor determines operation 412; or if the preset wait duration does not exceed the limit, the monitor feeds back to operation 409 to determine that the switch-off success feedback is received.

Operation 412. When the monitor determines that the preset wait duration exceeds the limit, the monitor determines that a system fault occurs. In this case, a fault lamp/a fault alarm/the like may be used to remind an on-site operator to perform manual troubleshooting.

There are also a plurality of manners in which the monitor obtains the on/off state of the working power source 100, namely, the switch-off/on feedback of the circuit breaker. For example, the on/off state may be obtained by using a feedback component disposed in the first circuit breaker 120, or may be obtained by using a sensor of the working power source. The following separately describes the two cases:

(1) The monitor 140 determines the on/off state of the working power source 100 by using a first contact disposed in the first on/off apparatus 1202 in the first circuit breaker 120.

Based on the circuit breaker structure shown in FIG. 2, for the on/off apparatus in the circuit breaker structure, a component that specifically controls a power source to be turned on/off may be implemented by using contact control, tripper control, or another component. Herein, an example in which the on/off apparatus is controlled by using a contact (for example, the primary contact 19 and/or the secondary contact 20 in FIG. 2) is used for description. Based on the power source switching control system shown in FIG. 1, the first on/off apparatus 1202 may further include a first contact. The first contact is configured to: detect the on/off state of the working power source 100, and feed back the on/off state of the working power source 100 to the monitor 140. Correspondingly, a similar feedback component may also be disposed for the second circuit breaker 1300. In some embodiments, in the second circuit breaker 1300, the second on/off apparatus 1302 further includes a second contact. The second contact is configured to: detect the on/off state of the backup power source 110, and feed back the on/off state of the backup power source 110 to the monitor 140. A feedback process may be implemented by (e.g., wiredly or wirelessly) connecting the contact and the monitor 140 by using the communication card slot 15 that is in the circuit breaker and that is used to communicate with the outside.

In this embodiment, with reference to the schematic diagram of the power source switching system in FIG. 1 and the schematic diagram of the circuit breaker in FIG. 2, the monitor 140 may specifically determine the on/off state of the power source by using the contact disposed in the on/off apparatus in the circuit breaker 1, so that the monitor 140 can learn of working statuses of the working power source 100 and the backup power source 110. Therefore, when the monitor 140 determines that the on/off state of the working power source 100 is adjusted from an on state to an off state, the monitor sends the switch-on signal to the second controller 1301 that is in the second circuit breaker 130 and that controls the backup power source 110 to be turned on/off, so that the power consumption load can be prevented, at the source, from being faulty and damaged when the working power source 100 and the backup power source 110 are simultaneously turned on. In some embodiments, after learning that the on/off state of the backup power source 110 is adjusted from an off state to an on state, the monitor 140 may also determine that the power source switching instruction that triggers the monitor 140 to perform the power source switching operation has been executed.

(2) The monitor 140 determines the on/off state of the working power source 100 by using a sensor disposed in the working power source.

The power source switching control system may further include a sensor. One terminal of the sensor is connected to the working power source 100 and the backup power source 110, and is configured to collect a power supply parameter of the working power source 100 and a power supply parameter of the backup power source 110. The other terminal of the sensor is connected to the monitor 140, and is configured to send the power supply parameter of the working power source 100 and the power supply parameter of the backup power source 110 to the monitor 140.

In this embodiment, there may be one or more sensors. In some embodiments, the sensor is configured to: collect the power supply parameter of the working power source 100 and the power supply parameter of the backup power source 110, and feed back the power supply parameter of the working power source 100 and the power supply parameter of the backup power source 110 to the monitor 140, so that the monitor 140 can learn of the power supply parameter of the working power source 100 and the power supply parameter of the backup power source 140. The sensor may be a voltage sensor, a current sensor, or the like. Therefore, the power supply parameter may include a voltage value, a current value, a curve in which a voltage or a current changes with time, or another power supply parameter. Therefore, the monitor 140 may respectively determine the on/off state of the working power source 100 and the on/off state of the backup power source 110 based on the power supply parameter of the working power source 100 and the power supply parameter of the backup power source 110. In some embodiments, as shown in the power source switching control system shown in FIG. 1, a sensor for detecting the working power source 100 may be disposed between the working power source 100 and the first circuit breaker 120, or may be disposed between the first circuit breaker 120 and the monitor 140. This is not limited herein. Similarly, a sensor for detecting the backup power source 110 may be disposed between the backup power source 110 and the second circuit breaker 130, or may be disposed between the second circuit breaker 130 and the monitor 140. This is not limited herein.

Figure 5:
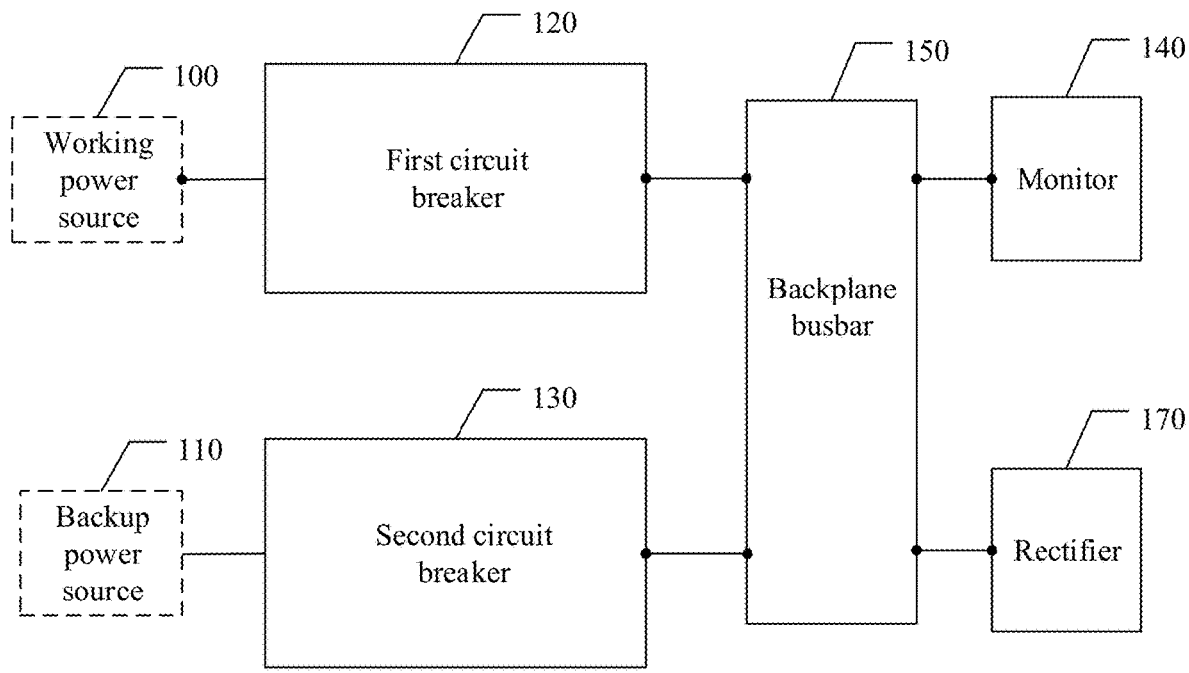
FIG. 5 is another schematic diagram of a power source switching control system according to an embodiment of this application.
Figure 6:
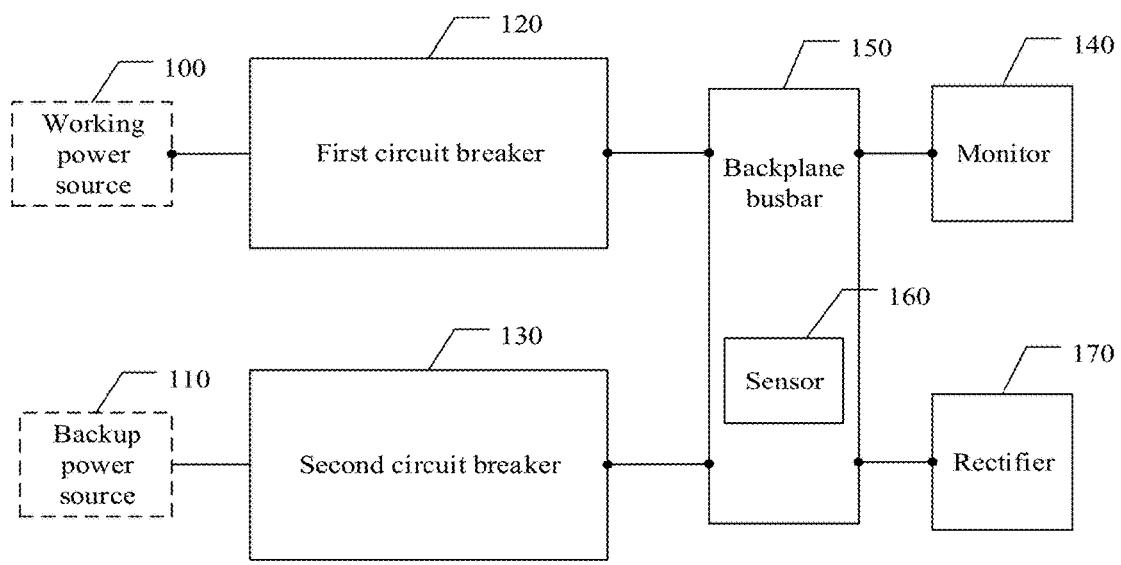
FIG. 6 is another schematic diagram of a power source switching control system according to an embodiment of this application.

In a preferred embodiment, a connection between the monitor 140 and each of the first circuit breaker 120 and the second circuit breaker 130 may be a wired connection. In this case, as shown in FIG. 5, the connection may be specifically implemented by using a busbar 150, for example, a communication backplane busbar 150. The communication backplane busbar 150 respectively connects the monitor 140 to the first circuit breaker 120 and the monitor 140 to the second circuit breaker 130. In some embodiments, based on the schematic diagram in FIG. 5, as shown in FIG. 6, a sensor 160 may be mounted on the communication backplane busbar 150. Subsequently, a power source may be further connected to the power consumption load by using a rectifier 170. In some embodiments, for a conventional circuit breaker, a voltage sensor and a current sensor need to be disposed inside each circuit breaker. In an aspect, a system cost and a volume are increased. In another aspect, a high temperature and strong electromagnetic interference of an arcing chamber of the circuit breaker affect precision, a life, and reliability of the sensor. Therefore, in this embodiment, in a preferred solution, the (e.g., voltage and current) sensor 160 may be disposed at a proper position on the backplane busbar 150, and the monitor 140 is responsible for functions such as power supply parameter collection, processing, metering, and protection determining.

Figure 7:
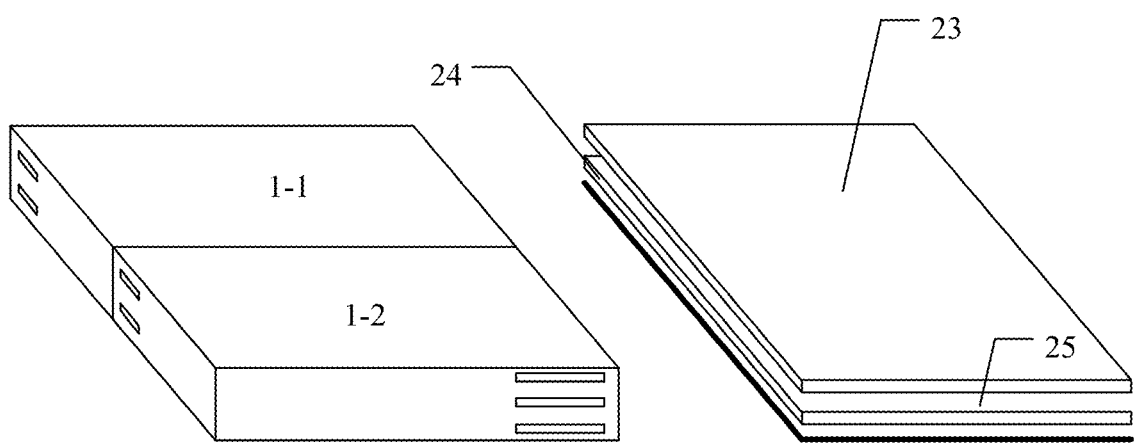
FIG. 7 is another schematic diagram of a power source switching control system according to an embodiment of this application.
Figure 8:
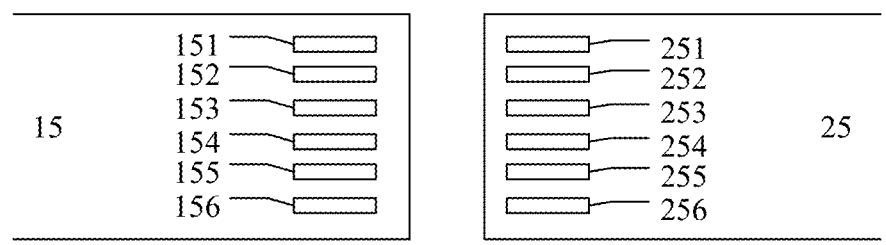
FIG. 8 is another schematic diagram of a power source switching control system according to an embodiment of this application.

FIG. 7 is a schematic diagram of an implementation of a first circuit breaker (1-1), a second circuit breaker (1-2), and a busbar 2. A communication backplane busbar 150 includes power terminals 23&24 and a control signal terminal 25, and the power terminals 23&24 are connected to a rectifier 4. With reference to the schematic diagrams of the structures of the circuit breakers in FIG. 2 and FIG. 3, it may be learned that in FIG. 8, a communication card slot 15 that is in each of the first circuit breaker (1-1) and the second circuit breaker (1-2) and that is used to communicate with the outside may be specifically connected to the control signal terminal 25 of the communication backplane busbar 150. It should be noted that a switch-off/on instruction signal and a switch-off/on feedback signal may be implemented by disposing a dedicated pin in FIG. 8, or may be implemented in a form of a communication data packet. This is not limited herein. The following Table 1 shows pin definition manners of a signal card slot 15 (e.g., female connector) and a corresponding backplane edge connector 25 (e.g., male connector) in a circuit breaker:

TABLE 1

| Female connector | Male connector | Signal definition |
| --- | --- | --- |
| 151 | 251 | Auxiliary power supply (source voltage & ground terminal) |
| 152 | 252 | |
| 153 | 253 | Communication receiving/sending (controller local area network/serial port) |
| 154 | 254 | |
| 155 | 255 | Switch-off/on instruction signal |
| 156 | 256 | Switch-off/on feedback signal |

2. The logic control apparatus interlocks the first circuit breaker 120 and the second circuit breaker 130 by using hardware.

In this embodiment of this application, in a specific implementation of the logic control apparatus, a hardware module may be added to interlock the first circuit breaker 120 and the second circuit breaker 130. The hardware module may be independently disposed, or may be integrated into the monitor 140. In this embodiment, that the hardware module is independently disposed is only used as an example for description. In some embodiments, implementation logic of the hardware module is as follows: Only when the hardware module determines that the on/off state of the working power source 100 is adjusted from an on state to an off state, the hardware module sends, to the second controller 1301 that is in the second circuit breaker 130 and that controls the backup power source 110 to be turned on/off, the switch-on signal sent by the monitor 140.

In some embodiments, the power source switching control system may further include a hardware module. The first controller 120 is connected to the monitor 140 by using the hardware module, and the second controller 130 is also connected to the monitor 140 by using the hardware module. In other words, after the first controller 1201 and the second controller 1301 are both connected to the hardware module, the hardware module is connected to the monitor 140. Only after determining that the on/off state of the working power source 100 is adjusted from an on state to an off state, the hardware module sends the switch-on signal of the monitor 140 to the second controller 1301, so that the second controller 1301 controls, based on the switch-on signal, the second on/off apparatus 1302 to adjust the on/off state of the backup power source 110 from an off state to an on state. Therefore, the hardware module is disposed to ensure a grid-connection accident occurring when the working power source 100 and the backup power source 110 are simultaneously turned on.

In some embodiments, to enhance hardware interlock reliability, further setting may be performed on the hardware module. In some embodiments, the following limitation is imposed: The hardware module sends, only to one of the first controller 1201 and the second controller 1202, a control signal sent by the monitor 140. The control signal may include the switch-off signal or the switch-on signal. In other words, in the signal delivered by the monitor 140, the switch-off signal can be sent only to one of the first controller 1201 and the second controller 1202, and the switch-on signal can also be sent only to one of the first controller 1201 and the second controller 1202. Therefore, a case in which both the working power source 100 and the backup power source 110 are turned off because the monitor 140 simultaneously sends the switch-off signal to the first circuit breaker 1201 and the second circuit breaker 1202 due to a fault may be avoided, and a grid-connection accident occurring when the working power source 100 and the backup power source 110 are simultaneously turned on because the monitor 140 simultaneously sends the switch-on signal to the first circuit breaker 1202 and the second circuit breaker 1302 due to a fault may be avoided. Signal control is strengthened by using the hardware apparatus to ensure power consumption safety.

Figure 9:
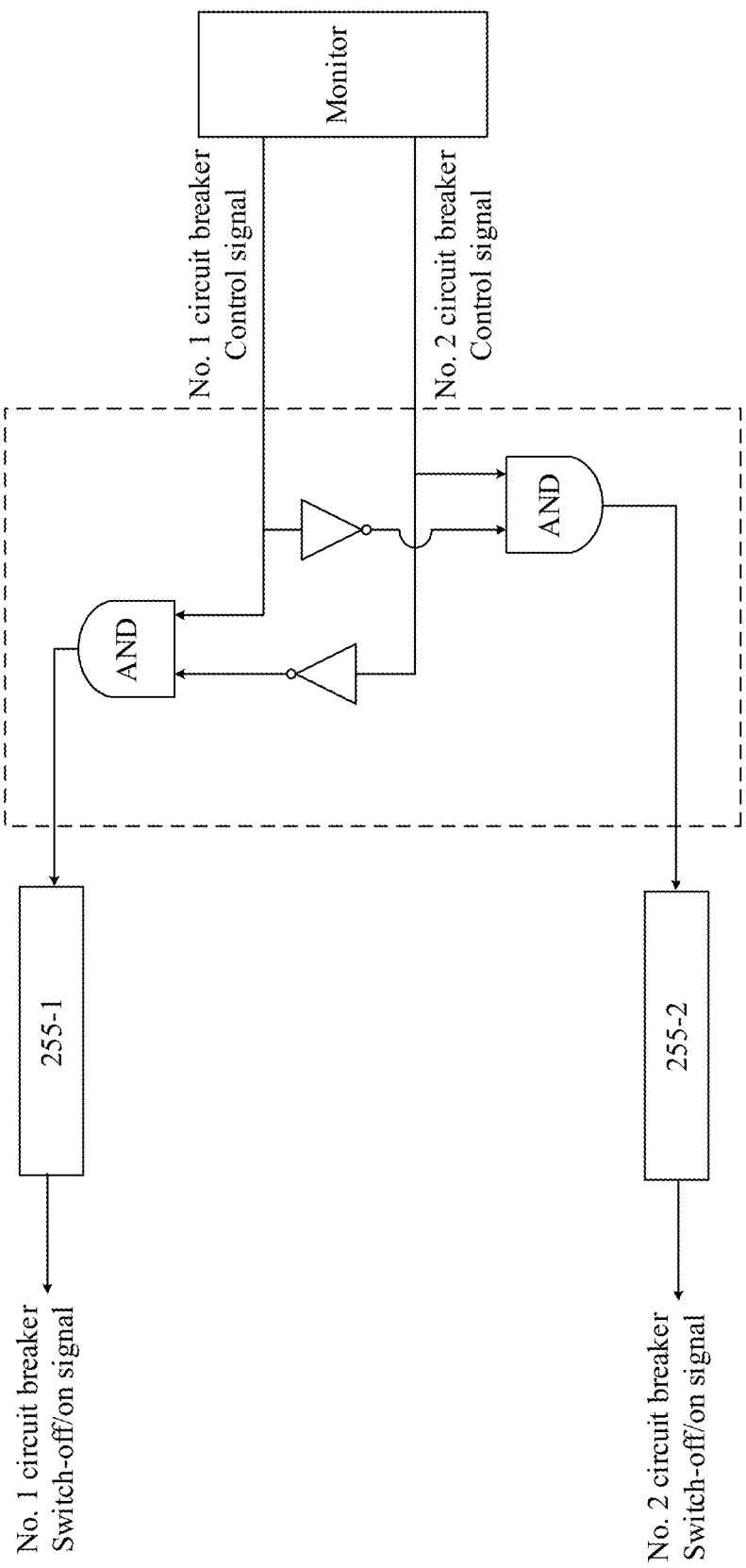
FIG. 9 is another schematic diagram of a power source switching control system according to an embodiment of this application.
Figure 10:
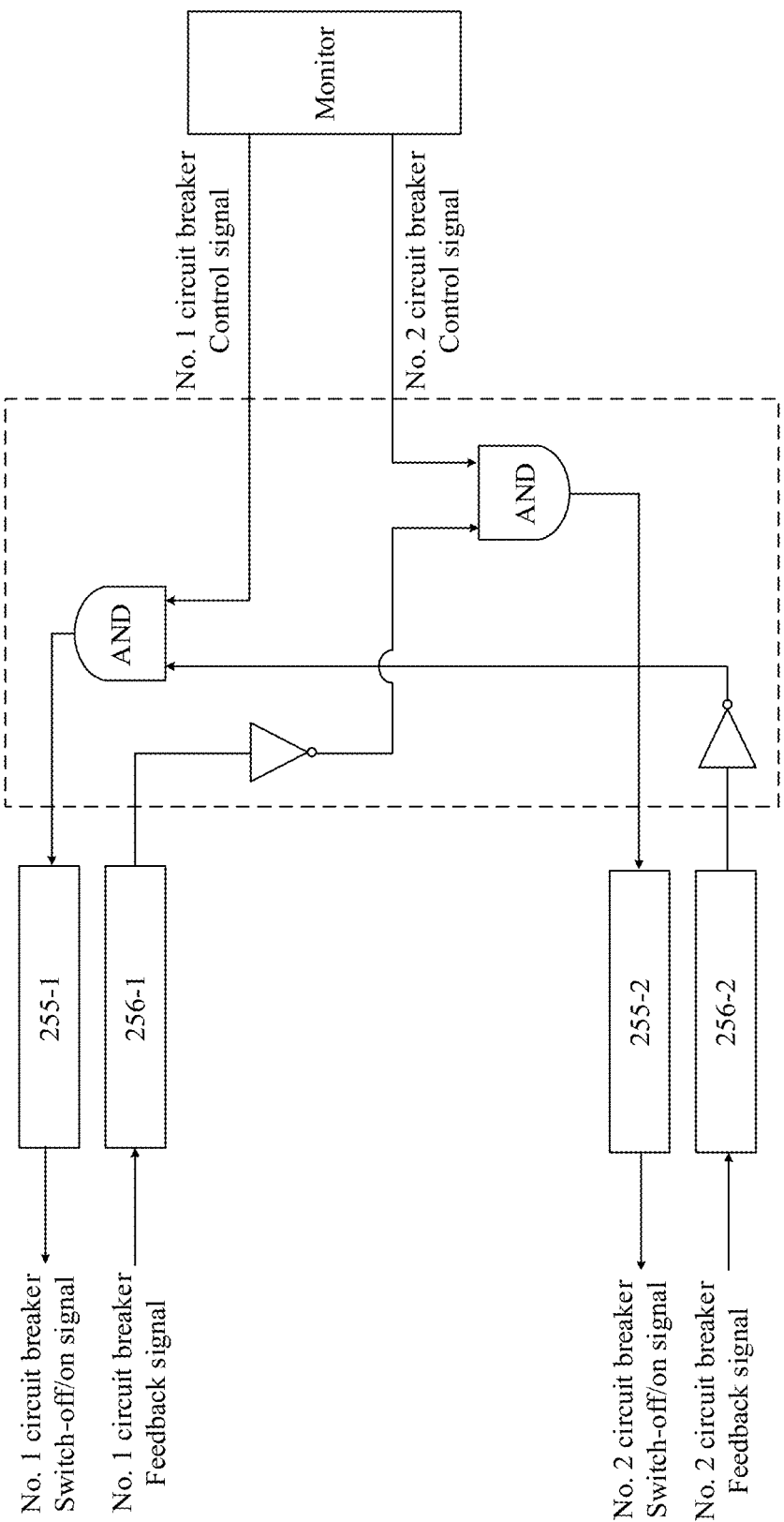
FIG. 10 is another schematic diagram of a power source switching control system according to an embodiment of this application.

In a specific implementation process of the solution, the hardware module may be implemented in a plurality of manners such as a hardware interlock circuit (for example, discrete logic gate hardware), a programmable logic controller (PLC), and a programmable chip (CPLD). An example in which the hardware module is implemented by using a simple hardware interlock circuit is only used for description herein. Refer to FIG. 9. A first circuit breaker (e.g., No. 1 circuit breaker) 255-1 and a second circuit breaker (e.g., No. 2 circuit breaker) 255-2 are used as an example herein. A hardware interlock circuit built by using an electronic component may be added between a connection between the monitor 140 and each of the No. 1 circuit breaker 255-1 and the No. 2 circuit breaker 255-2. In this way, when a switch-off/on signal corresponding to any power source is a turn-on signal (corresponding to a high level or a low level), the other power source is pulled to a turn-off signal, to implement a function of strengthening interlock reliability by using hardware. In a power source switching operation, only when a switch that is turned on is changed to a turn-off state, a turn-on signal of the other switch can be delivered. An example in which a high level is a turn-on command and the high level is a turn-on state feedback is used for description. A function implemented by the hardware interlock circuit is shown in FIG. 9. Only a control signal corresponding to the No. 1 circuit breaker or a control signal corresponding to the No. 2 circuit breaker may be delivered to a corresponding circuit breaker. Based on this, after there is a state feedback line and the hardware interlock circuit is used, power source switching operation control logic may be changed to a form shown in FIG. 10, to increase a power source switching operation speed.

Figure 11:
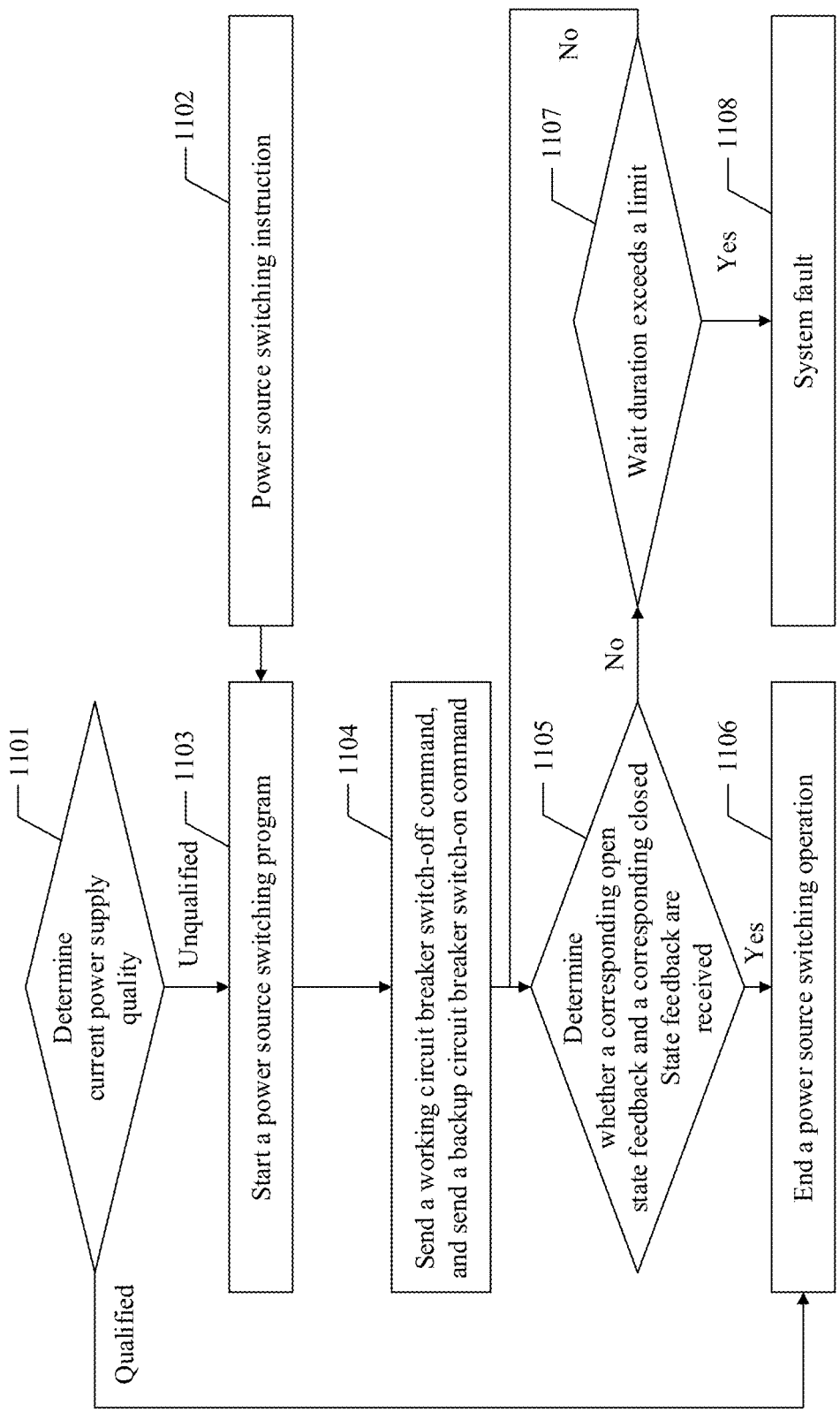
FIG. 11 is another schematic diagram of a power source switching control system according to an embodiment of this application.

In some embodiments, when the hardware logic control apparatus is added, for a working process of the monitor, refer to FIG. 11. A related process executed by the monitor may include the following operations:

Operation 1101. The monitor determines power supply quality of a current working power source; and if the power supply quality of the current working power source is qualified, the monitor performs operation 1106; or if the power supply quality of the current working power source is not qualified, the monitor performs operation 1103.

Operation 1102. When receiving a power source switching instruction, the monitor is triggered to perform operation 1103.

Operation 1103. When determining, in operation 1101, that the power supply quality of the current working power source is not qualified, or when receiving the power source switching instruction in operation 1102, the monitor starts a power source switching program.

Operation 1104. The monitor sends a working circuit breaker switch-off command, and sends a backup circuit breaker switch-on command, that is, when sending a switch-off command to a circuit breaker corresponding to the current working power source, the monitor also sends a switch-on command to a circuit breaker corresponding to a backup power source.

Operation 1105. The monitor determines whether a switch-off success feedback and a switch-on success feedback are received, that is, the monitor determines whether a switch-off feedback of the circuit breaker corresponding to the current working power source and a switch-on feedback of the circuit breaker corresponding to the backup power source are received; and if the switch-off success feedback and the switch-on success feedback are received, the monitor performs operation 1106; if the switch-off success feedback and the switch-on success feedback are not received, the monitor performs operation 1107.

Operation 1106. If the monitor determines that the switch-off success feedback and the switch-on success feedback are received, the monitor determines that a current power source switching operation ends, and may exit the power source switching program.

Operation 1107. If the monitor determines, in operation 1105, that the switch-off success feedback and the switch-on success feedback are not received, the monitor determines whether preset wait duration exceeds a limit; and if the preset wait duration exceeds the limit, the monitor determines operation 1108; or if the preset wait duration does not exceed the limit, the monitor feeds back to operation 1105 to determine that the switch-off success feedback and the switch-on success feedback are received.

Operation 1108. When the monitor determines that the preset wait duration exceeds the limit, the monitor determines that a system fault occurs. In this case, a fault lamp/a fault alarm/the like may be used to remind an on-site operator to perform manual troubleshooting.

The foregoing describes the power source switching control system in this embodiment of this application. The following describes a power source switching control process of the power source switching control system from a perspective of a power source switching control method.

Figure 12:
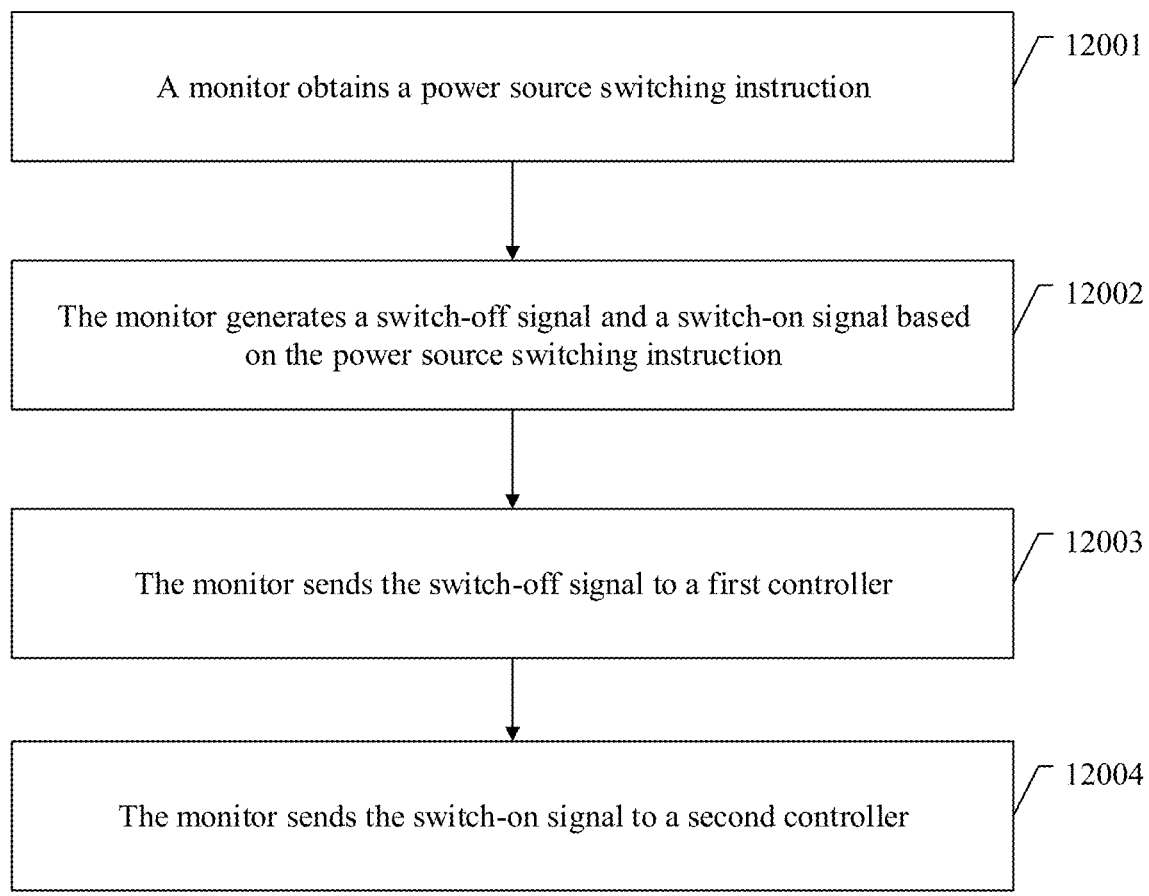
FIG. 12 is a schematic diagram of a power source switching control method according to an embodiment of this application.

Refer to FIG. 12. A power source switching control method in an embodiment of this application is applied to the power source switching control system in the foregoing embodiment. In some embodiments, the power source switching control system may be applied to a scenario in which a plurality of power sources supply power. In some embodiments, to ensure continuous power supply without interruption, the plurality of power sources include a working power source that is currently working and a backup power source for emergency auxiliary use. For any power source in the plurality of power sources, if the power source is currently supplying power, the power source is the working power source; or if the power source is not currently supply power, the power source is the backup power source. The working power source and the backup power source are backed up by each other. The power source switching control system includes a first circuit breaker connected to the working power source, a second circuit breaker connected to the backup power source, and a monitor configured to control the first circuit breaker to be turned on/off and the second circuit breaker to be turned on/off. The power source switching control method specifically includes the following operations:

12001. The monitor obtains a power source switching instruction.

In this embodiment, the monitor may generate or obtain a manually input power source switching instruction in a plurality of manners. The power source switching instruction is used to indicate that in the plurality of power sources, the working power source needs to be turned off and the backup power source needs to be turned on.

In some embodiments, the power source switching instruction obtained by the monitor may be generated when the monitor detects that a fault (including a frequency fluctuation, a voltage fluctuation, an imbalance, a voltage drop, a harmonic, and the like that exceed a limit) occurs in a current power source, or may be obtained when the power source switching instruction (including an instruction delivered by an administrator by remotely logging in to the monitor, an instruction that is input by an on-site operator, and the like) is sent in another operation, or may be obtained in another manner. This is not limited herein.

12002. The monitor generates a switch-off signal and a switch-on signal based on the power source switching instruction.

In this embodiment, the monitor generates, based on the power source switching instruction obtained in operation 12001, the switch-off signal used to control the working power source to be turned off and the switch-on signal used to control the backup power source to be turned on.

12003. The monitor sends the switch-off signal to a first controller.

In this embodiment, the monitor sends the switch-off signal to the first controller. The first controller is included in the first circuit breaker. The first circuit breaker includes a first on/off apparatus. The first on/off apparatus is configured to adjust an on/off state of the working power source under control of the first controller, that is, the first on/off apparatus is configured to adjust, from an on state to an off state under control of the first controller, the working power source that is currently supplying power.

12004. The monitor sends the switch-on signal to a second controller.

In this embodiment, the monitor sends the switch-on signal to the second controller. The second controller is included in the second circuit breaker. The second circuit breaker includes a second on/off apparatus. The second on/off apparatus is configured to adjust an on/off state of the backup power source under control of the second controller, that is, the second on/off apparatus is configured to adjust, from an off state to an on state under control of the second controller, the backup power source that is not currently supplying power.

Therefore, for the first circuit breaker and the second circuit breaker, an on/off apparatus specifically adjusts, based on a signal of the monitor, an on/off state of a power source connected to a circuit breaker, that is, adjusts, from an on state to an off state based on the switch-off signal of the monitor, the working power source that is currently working, and adjusts the backup power source from an off state to an on state based on the switch-on signal of the monitor, to implement a process of power source switching between the working power source and the backup power source. In comparison with a conventional technology in which a power source switching process is implemented by controlling a circuit breaker by using a mechanical connection, there is no space limitation caused by the mechanical connection, and flexible power source arrangement is easy to implement.

It should be noted that the power source switching control system may be applied to a scenario in which a plurality of power sources supply power. A power source quantity corresponding to the plurality of power sources is n (e.g., n is an integer greater than 1), and power source quantities corresponding to the working power source and the backup power source are respectively a and b (e.g., both a and b are integers greater than 0). The quantity may be adjusted based on a working environment of an on-site operation. This is not limited herein. Correspondingly, a quantity of first circuit breakers configured to control the working power source may be equal to the power source quantity corresponding to the working power source, and a quantity of second circuit breakers configured to control the backup power source may also be equal to the power source quantity corresponding to the backup power source. In some embodiments, in an actual operation process, when the quantity of backup power sources is large, a power source with good power supply quality may be preferably selected from the backup power sources based on power supply quality of the backup power sources.

In some embodiments, the power source switching control method further includes: The monitor obtains a switch-off feedback signal, where the switch-off feedback signal is used to indicate that the on/off state of the working power source is adjusted from an on state to an off state. Only after the monitor determines that the switch-off feedback signal is received, that is, only after the monitor determines that the on/off state of the working power source is adjusted from an on state to an off state, the monitor sends the switch-on signal to the second controller. For specific operations performed by the monitor, refer to the execution process in FIG. 4. Therefore, only after the monitor determines that the switch-off feedback signal is received, that is, only after the monitor determines that the on/off state of the working power source is adjusted from an on state to an off state, the monitor sends the switch-on signal to the second controller. Therefore, the monitor can be prevented from sending the switch-on signal to the second controller before the on/off state of the working power source is adjusted from an on state to an off state, to avoid a grid-connection accident occurring when the working power source and the backup power source are simultaneously turned on.

In some embodiments, a process in which the monitor obtains the switch-off feedback signal may be in a plurality of forms. The signal may be obtained by using a contact disposed in a circuit breaker. In some embodiments, the monitor receives the switch-off feedback signal sent by a first contact, where the first contact is included in the first circuit breaker, and the first contact is configured to detect the on/off state of the working power source. Therefore, a specific implementation in which the monitor obtains the switch-off feedback signal is provided, that is, the switch-off feedback signal may be obtained by using the first contact in the first circuit breaker, to improve implementability of the solution.

In some embodiments, a process in which the monitor obtains the switch-off feedback signal may be that the signal is obtained by using a sensor. In some embodiments, the monitor receives the switch-off feedback signal sent by the sensor, where the sensor is connected to the working power source, and is configured to collect a power supply parameter of the working power source, and the power supply parameter of the working power source includes the on/off state of the working power source. Therefore, a specific implementation in which the monitor obtains the switch-off feedback signal is provided, that is, the switch-off feedback signal may be obtained by using the power supply parameter collected by the sensor, to improve implementability of the solution.

Figure 13:
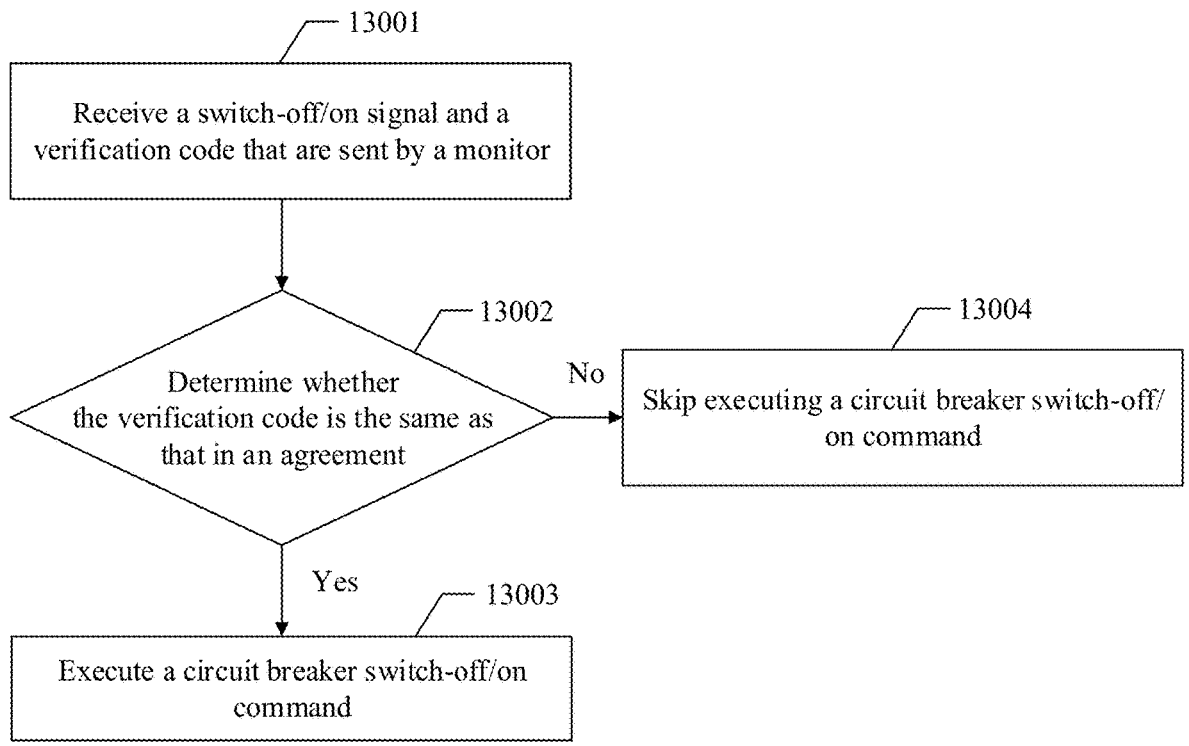
FIG. 13 is another schematic diagram of a power source switching control method according to an embodiment of this application.

In some embodiments, the power source switching control method may further include: The monitor sends a switch-off verification code to the first controller, where the switch-off verification code is used by the first controller to verify validity of the switch-off signal; and/or the monitor sends a switch-on verification code to the second controller, where the switch-on verification code is used by the second controller to verify validity of the switch-on signal. In some embodiments, after the monitor respectively sends the switch-off verification code and the switch-on verification code to the first controller and the second controller, the first controller and the second controller may specifically determine, based on the switch-off verification code and the switch-on verification code, whether to execute a switch-off/on instruction corresponding to the corresponding switch-off/on signal. As described in the foregoing content, the first controller and the second controller that are disposed in the first circuit breaker and the second circuit breaker may be implemented by using a similar structure. Herein, the first controller and the second controller may also be implemented by using a similar structure. In this embodiment, after receiving the switch-off/on signal sent by the monitor, a process executed by the controller in the circuit breaker is shown in FIG. 13. In some embodiments, the process may include the following operations:

13001. The controller receives a switch-off/on signal and a verification code that are sent by the monitor. In some embodiments, for a circuit breaker corresponding to a current working power source, the controller receives the switch-off signal and a switch-off verification code, and for a circuit breaker corresponding to a current backup power source, the controller receives the switch-on signal and a switch-on verification code.

13002. The controller determines whether the verification code received in operation 13001 is the same as that in an agreement, that is, determines whether the verification code is the same as preset content; and if the verification code is the same as the preset content, the controller determines that the switch-off/on signal corresponding to the verification code is a valid signal, and performs operation 13003; or if the verification code is not the same as the preset content, the controller determines that the switch-off/on signal corresponding to the verification code is an invalid signal, and performs operation 13004.

13003. If the controller determines, in operation 13002, that the switch-off/on signal corresponding to the verification code is a valid signal, the controller executes a switch-off/on command corresponding to the switch-off/on signal. In some embodiments, for the circuit breaker corresponding to the current working power source, the controller performs switch-off based on the switch-off signal, and for the circuit breaker corresponding to the current backup power source, the controller performs switch-on based on the switch-on signal.

13004. If the controller determines, in operation 13002, that the switch-off/on signal corresponding to the verification code is not a valid signal, the controller does not execute a switch-off/on command corresponding to the switch-off/on signal. In other words, in this case, the monitor may send an error instruction, or the controller receives a malicious operation instruction sent by another device, or another case exists. In this case, the controller does not execute the corresponding switch-off/on command.

In this embodiment, to avoid a misoperation caused by a communication fault, the switch-off verification code and/or the switch-on verification code are/is added, and a signal sent by the monitor to the first controller and/or the second controller includes several fixed parity bits. The first controller and/or the second controller automatically detect/detects and check/checks whether the parity bits are normal. If the parity bits are normal, the switch-off/on command is executed. If the parity bits are not normal, execution of the switch-off/on command is rejected. Therefore, it is ensured that when the monitor is faulty (e.g., is powered off) or when there is a communication fault, the first controller and/or the second controller can maintain normal on/off states of the first circuit breaker and/or the second circuit breaker, to continue to supply power.

In some embodiments, the first circuit breaker and the second circuit breaker may be circuit breakers of a similar structure, that is, the monitor may obtain the on/off state of the backup power source by using a second contact disposed in the second circuit breaker. In some embodiments, the monitor receives a switch-on feedback signal sent by the second contact, where the second contact is included in the second circuit breaker, and the second contact is configured to detect the on/off state of the backup power source. Therefore, a specific implementation in which the monitor obtains the switch-on feedback signal is provided, that is, the switch-on feedback signal may be obtained by using the second contact in the second circuit breaker, so that the monitor can learn of the on/off state of the backup power source connected to the second circuit breaker, to improve implementability of the solution.

In some embodiments, the first circuit breaker and the second circuit breaker may be circuit breakers of a similar structure, that is, the monitor may obtain the on/off state of the backup power source by using a sensor. In some embodiments, the monitor receives a switch-on feedback signal sent by the sensor, where the sensor is connected to the backup power source, and is configured to collect a power supply parameter of the backup power source, and the power supply parameter of the backup power source includes the on/off state of the backup power source. Therefore, a specific implementation in which the monitor obtains the switch-on feedback signal is provided, that is, the switch-on feedback signal may be obtained by using the second contact in the second circuit breaker, so that the monitor can learn of the on/off state of the backup power source connected to the second circuit breaker, to improve implementability of the solution.

The foregoing describes the power source switching control method implemented by using the monitor. With reference to the accompanying drawings, the following describes a monitor provided in an embodiment of this application.

Figure 14:
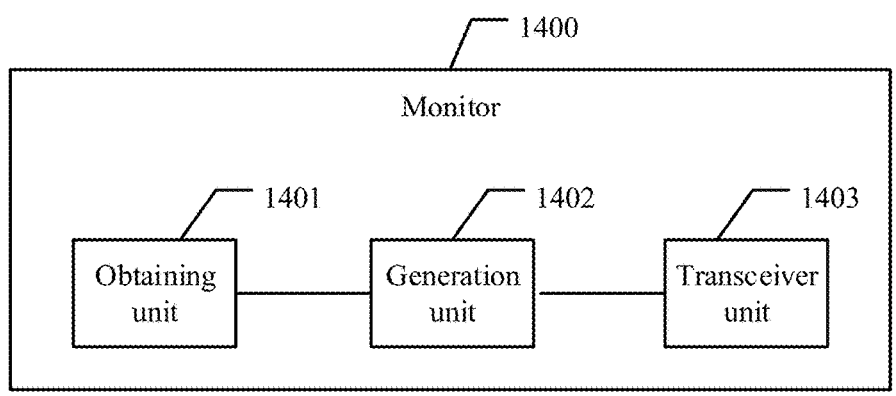
FIG. 14 is a schematic diagram of a monitor according to an embodiment of this application.

Refer to FIG. 14. A monitor 1400 provided in an embodiment of this application is applied to a power source switching control system. The power source switching control system includes a first circuit breaker connected to a working power source and a second circuit breaker connected to a backup power source. The monitor 1400 includes:

an obtaining unit 1401, configured to obtain, by the monitor, a power source switching instruction;

a generation unit 1402, configured to generate a switch-off signal and a switch-on signal based on the power source switching instruction; and a transceiver unit 1403, configured to send the switch-off signal to a first controller, where the first controller is included in the first circuit breaker, the first circuit breaker includes a first on/off apparatus, and the first on/off apparatus is configured to adjust an on/off state of the working power source under control of the first controller, where the transceiver unit 1403 is further configured to send the switch-on signal to a second controller, where the second controller is included in the second circuit breaker, the second circuit breaker includes a second on/off apparatus, and the second on/off apparatus is configured to adjust an on/off state of the backup power source under control of the second controller.

In some embodiments, the obtaining unit 1401 is further configured to obtain a switch-off feedback signal, where the switch-off feedback signal is used to indicate that the on/off state of the working power source is adjusted from an on state to an off state.

The transceiver unit 1403 is further configured to: after the monitor determines that the switch-off feedback signal is received, send, by the monitor, the switch-on signal to the second controller.

In some embodiments, the obtaining unit 1401 is specifically configured to:

receive the switch-off feedback signal sent by a first contact, where the first contact is included in the first circuit breaker, and the first contact is configured to detect the on/off state of the working power source.

In some embodiments, the obtaining unit 1401 is specifically configured to:

receive the switch-off feedback signal sent by a sensor, where the sensor is connected to the working power source, and is configured to collect a power supply parameter of the working power source, and the power supply parameter of the working power source includes the on/off state of the working power source.

In some embodiments, the transceiver unit 1403 is further configured to:

send a switch-off verification code to the first controller, where the switch-off verification code is used by the first controller to verify validity of the switch-off signal.

In some embodiments, the transceiver unit 1403 is further configured to:

send a switch-on verification code to the second controller, where the switch-on verification code is used by the second controller to verify validity of the switch-on signal.

In some embodiments, the transceiver unit 1403 is further configured to:

receive a switch-on feedback signal sent by a second contact, where the second contact is included in the second circuit breaker, and the second contact is configured to detect the on/off state of the backup power source.

In some embodiments, the transceiver unit 1403 is further configured to:

receive a switch-on feedback signal sent by the sensor, where the sensor is connected to the backup power source, and is configured to collect a power supply parameter of the backup power source, and the power supply parameter of the backup power source includes the on/off state of the backup power source.

It should be noted that, for details of content such as information exchange between units of the foregoing monitor 1400 and execution processes thereof, refer to the descriptions in the foregoing method embodiments of this application. Details are not described herein again.

Figure 15:
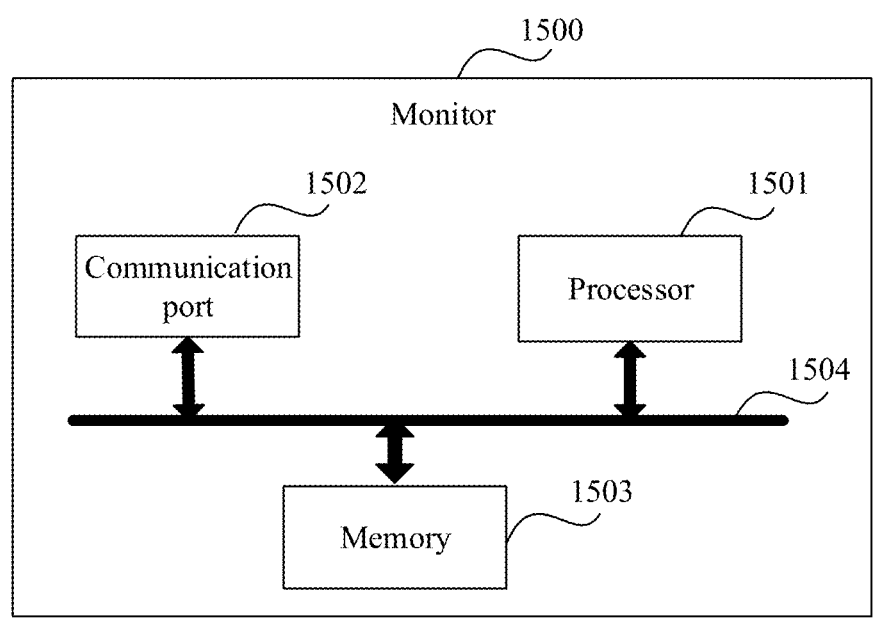
FIG. 15 is another schematic diagram of a monitor according to an embodiment of this application.

FIG. 15 is a possible schematic diagram of a logical structure of the monitor 1500 in the foregoing embodiment according to an embodiment of this application. The monitor 1500 includes a processor 1501, a communication port 1502, a memory 1503, and a bus 1504. The processor 1501, the communication port 1502, and the memory 1503 are connected to each other through the bus 1504. In this embodiment of this application, the processor 1501 is configured to perform control processing on an action of the monitor 1500. For example, the processor 1501 is configured to execute a function executed by the generation unit 1402 in FIG. 14. The communication port 1502 is configured to execute functions executed by the obtaining unit 1401 and the transceiver unit 1403 in FIG. 14, and support the monitor 1500 in performing communication. The memory 1503 is configured to store program code and data of the monitor 1500.

The processor 1501 may be a central processing unit, a general-purpose processor, a digital signal processor, an application-specific integrated circuit, a field programmable gate array or another programmable logic device, a transistor logic device, a hardware component, or any combination thereof. The processor 1501 may implement or execute various example logical blocks, modules, and circuits described with reference to content disclosed in this application. In some embodiments, the processor may be a combination of processors implementing a computing function, for example, a combination of one or more microprocessors, or a combination of a digital signal processor and a microprocessor. The bus 1504 may be a peripheral component interconnect (PCI) bus, an extended industry standard architecture (EISA) bus, or the like. The bus may be classified into an address bus, a data bus, a control bus, or the like. For ease of representation, only one thick line is used to represent the bus in FIG. 15, but this does not mean that there is only one bus or only one type of bus.

An embodiment of this application further provides a computer-readable storage medium that stores one or more computer execution instructions. When the computer execution instructions are executed by a processor, the processor performs the foregoing power source switching control method.

An embodiment of this application further provides a computer program product that stores one or more computer execution instructions. When the computer execution instructions are executed by a processor, the processor performs the foregoing power source switching control method.

This application further provides a chip system, and the chip system includes a processor, configured to support a controller in implementing a function in the foregoing power source switching control method. In a possible design, the chip system may further include a memory. The memory is configured to store necessary program instructions and data. The chip system may include a chip, or may include a chip and another discrete device.

It may be clearly understood by persons skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In some embodiments, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In some embodiments, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:
1. A system of switching power sources, comprising:
a monitor;
a hardware interlock circuit connected to the monitor;
a first circuit breaker connecting a working power source to the hardware interlock circuit; and
a second circuit breaker connecting a backup power source to the hardware interlock circuit, wherein:
the monitor sends a first circuit breaker control signal and a second circuit breaker control signal different from the first circuit breaker control signal to the hardware interlock circuit,
the hardware interlock circuit sends a switch-off signal to the first circuit breaker to adjust an on/off state of the working power source, and the hardware interlock circuit sends a switch-on signal to the second circuit breaker to adjust an on/off state of the backup power source.

2. The system according to claim 1, wherein:
the hardware interlock circuit comprises a logic control apparatus;
the logic control apparatus generates the switch-on signal after the logic control apparatus determines that the on/off state of the working power source is adjusted from an on state to an off state.

3. The system according to claim 2, wherein the logic control apparatus is configured to send, either the first circuit breaker control signal or the second circuit breaker control signal, from the monitor to one of the first circuit breaker or the second circuit breaker.

4. The system according to claim 1, wherein the first circuit breaker comprises a first on/off apparatus that includes a first contact configured to: detect the on/off state of the working power source, and send feedback of the on/off state of the working power source to the monitor; and
wherein the second circuit breaker comprises a second on/off apparatus that includes a second contact, and the second contact is configured to: detect the on/off state of the backup power source, and send feedback of the on/off state of the backup power source to the monitor.

5. The system according to claim 1, further comprising a sensor, wherein:
a first terminal of the sensor is connected to the working power source and the backup power source, and is configured to collect a power supply parameter of the working power source and a power supply parameter of the backup power source; and
a second terminal of the sensor is connected to the monitor to send the power supply parameter of the working power source and the power supply parameter of the backup power source.

6. The system according to claim 1, further comprising a busbar, wherein
the monitor is connected to both the first circuit breaker and the second circuit breaker through the busbar.

7. A method, applied to a power source switching control system, wherein the power source switching control system comprises a first circuit breaker connected to a working power source and a second circuit breaker connected to a backup power source, and the method comprises:
generating, by a monitor, a switch-off signal and a switch-on signal;
sending, by the monitor, the switch-off signal to a first controller, wherein the first controller is comprised in the first circuit breaker, the first circuit breaker comprises a first on/off apparatus, and the first on/off apparatus is configured to adjust an on/off state of the working power source under control of the first controller; and
sending, by the monitor, the switch-on signal to a second controller, wherein the second controller is comprised in the second circuit breaker, the second circuit breaker comprises a second on/off apparatus, and the second on/off apparatus is configured to adjust an on/off state of the backup power source under control of the second controller.

8. The method according to claim 7, wherein the method further comprises:
obtaining, by the monitor, a switch-off feedback signal, wherein the switch-off feedback signal is used to indicate that the on/off state of the working power source is adjusted from an on state to an off state; and
after the monitor receives the switch-off feedback signal, sending, by the monitor, the switch-on signal to the second controller.

9. The method according to claim 8, wherein the obtaining, by the monitor, a switch-off feedback signal comprises:
receiving, by the monitor, the switch-off feedback signal sent by a first contact, wherein the first contact is comprised in the first circuit breaker, and the first contact is configured to detect the on/off state of the working power source.

10. The method according to claim 8, wherein the obtaining, by the monitor, a switch-off feedback signal comprises:
receiving, by the monitor, the switch-off feedback signal sent by a sensor, wherein the sensor is connected to the working power source, and is configured to collect a power supply parameter of the working power source, and the power supply parameter of the working power source comprises the on/off state of the working power source.

11. The method according to claim 8, wherein the method further comprises:
sending, by the monitor, a switch-off verification code to the first controller, wherein the switch-off verification code is used by the first controller to verify validity of the switch-off signal.

12. The method according to claim 8, wherein the method further comprises:
sending, by the monitor, a switch-on verification code to the second controller, wherein the switch-on verification code is used by the second controller to verify validity of the switch-on signal.

13. The method according to claim 8, wherein the method further comprises:
receiving, by the monitor, a switch-on feedback signal sent by a second contact, wherein the second contact is comprised in the second circuit breaker, and the second contact is configured to detect the on/off state of the backup power source.

14. The method according to claim 8, wherein the method further comprises:
receiving, by the monitor, a switch-on feedback signal sent by a sensor, wherein the sensor is connected to the backup power source, and is configured to collect a power supply parameter of the backup power source, and the power supply parameter of the backup power source comprises the on/off state of the backup power source.

15. A computer-readable storage medium, wherein the computer-readable storage medium is configured to store program instructions, and when the program instructions are run on a computer, the computer is enabled to perform a method, wherein the method further comprises:
obtaining, by a monitor, a switch-off feedback signal, wherein the switch-off feedback signal is used to indicate that an on/off state of a working power source is adjusted from an on state to an off state; and
after the monitor receives the switch-off feedback signal, sending, by the monitor, a switch-on signal to a second controller.

16. The system according to claim 4, wherein the first contact is configured to control the first on/off apparatus to adjust the on/off state of the working power source from the on state to the off state further based on a switch-off signal of the monitor, wherein the second contact is configured to control the second on/off apparatus to adjust the on/off state of the backup power source from the off state to the on state further based on a switch-on signal.

17. The system according to claim 2, the logic control apparatus sends the switch-on signal of the monitor to the second circuit breaker.

18. The system according to claim 17, wherein either the first circuit breaker control signal or the second circuit breaker control signal comprises the switch-off signal or the switch-on signal.

19. The method according to claim 7, further comprising:
   obtaining, by the monitor, a power source switching instruction;
   wherein generating, by the monitor, the switch-off signal is further based on the power source switching instruction.

20. The method according to claim 7, further comprising:
   obtaining, by the monitor, a power source switching instruction;
   wherein generating, by the monitor, the switch-on signal is further based on the power source switching instruction.

* * * * *